United States Patent [19]
Parkinson

[11] Patent Number: 6,113,177
[45] Date of Patent: Sep. 5, 2000

[54] TRUCK CAP WITH REAR DOOR TAILGATE PROTECTOR

[75] Inventor: David Parkinson, Spirit Lake, Iowa

[73] Assignee: Penda Glasstite, Inc., Portage, Wis.

[21] Appl. No.: 09/128,092

[22] Filed: Aug. 3, 1998

[51] Int. Cl.$^7$ .................... B60J 1/18; B60J 10/02
[52] U.S. Cl. .............. 296/151; 296/106; 296/146.8; 49/368
[58] Field of Search ................... 296/50, 100.06, 296/106, 146.8, 151, 152, 154, 156, 163, 164; 49/367, 368, 476.1

[56] References Cited

U.S. PATENT DOCUMENTS

| D. 148,831 | 2/1948 | Wagner | D12/190 |
|---|---|---|---|
| 1,320,494 | 11/1919 | Plym | 49/470 |
| 1,729,243 | 9/1929 | Bricker | 49/470 |
| 3,678,627 | 7/1972 | Dixon | 49/493.1 |
| 4,341,413 | 7/1982 | Woods | 296/50 |
| 5,586,793 | 12/1996 | Davenport | 296/67 |

FOREIGN PATENT DOCUMENTS

| 322559 | 8/1957 | Switzerland | 49/476.1 |

*Primary Examiner*—D. Glenn Dayoan
*Assistant Examiner*—Paul Chenevert
*Attorney, Agent, or Firm*—Hill & Simpson

[57] ABSTRACT

A rear door assembly for a truck cap for mounting onto a truck bed is provided with a specially modified plate disposed at a lower edge of the rear door of the truck cap for cooperatively engaging protective ribs that are disposed on upper ends of tailgates of late model trucks. The enclosure plates disposed on the rear doors of the truck caps extend outwardly and downwardly so as to conform to the general shapes of said currently-available tailgate protector ribs. The enclosure plates enable the rear door to close fully and provide the requisite engagement between the lower end of the rear door and the upper end of the tailgate so as to prevent moisture and dirt from entering the inside of the truck cap.

3 Claims, 2 Drawing Sheets

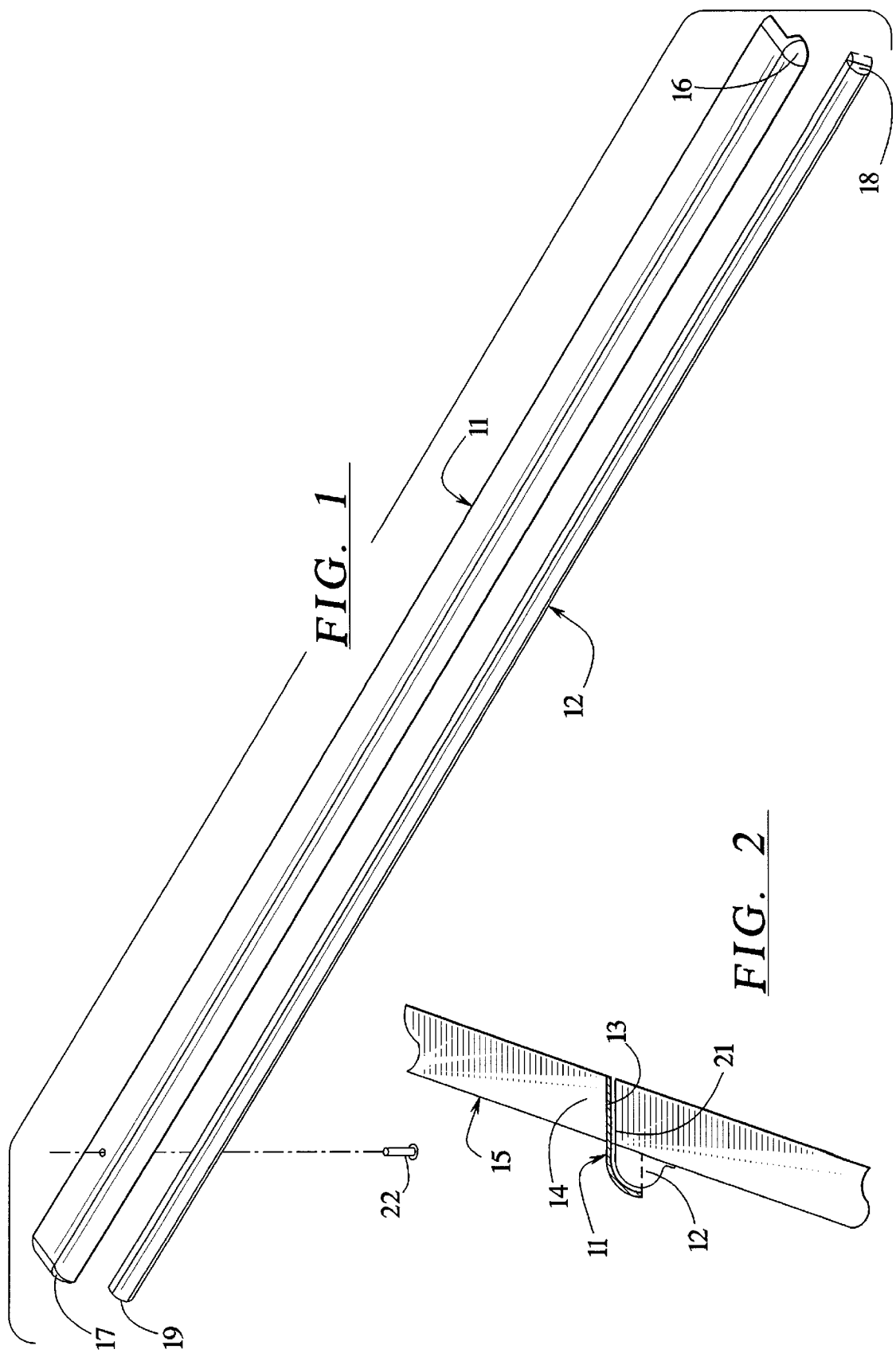

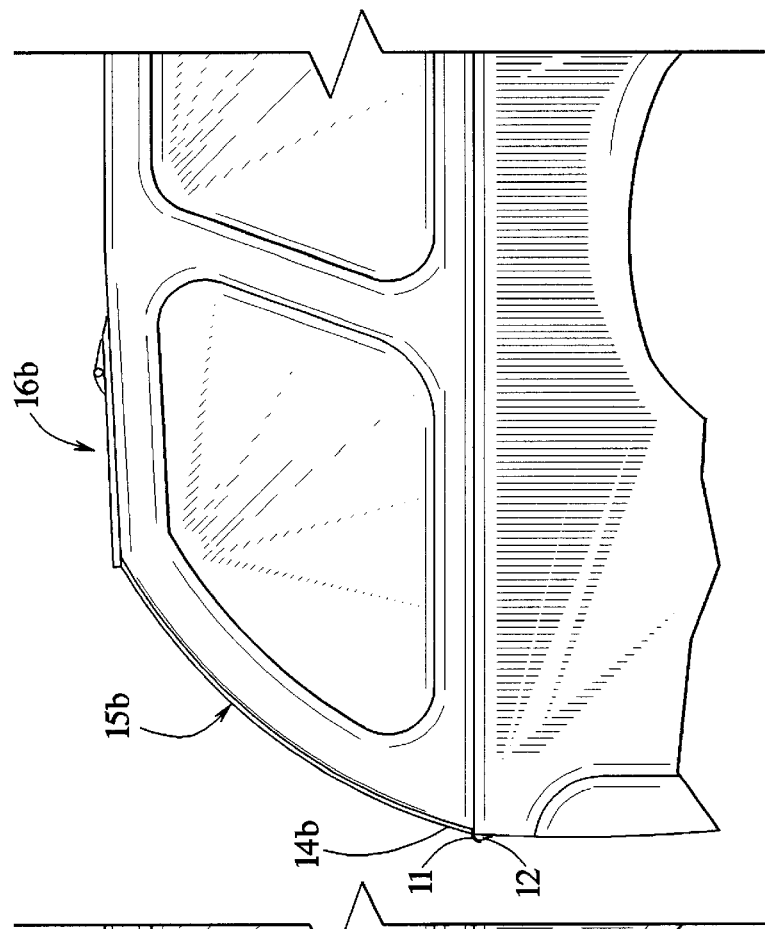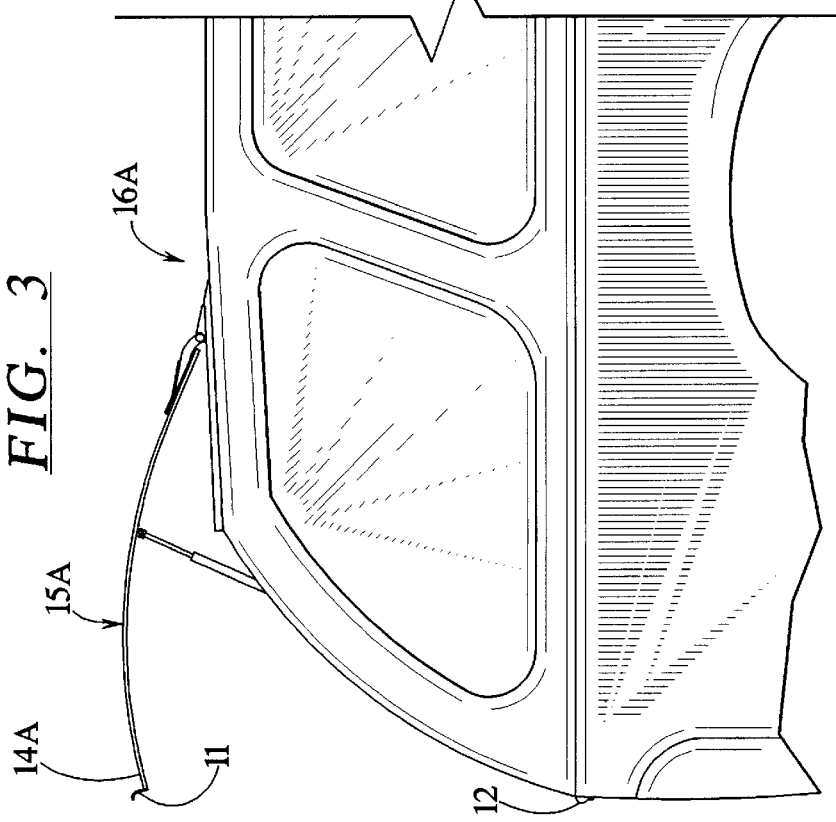

TRUCK CAP WITH REAR DOOR TAILGATE PROTECTOR

FIELD OF THE INVENTION

The present invention relates generally to rear doors for truck caps, otherwise known as camper shells, pickup tops or canopies. More specifically, the present invention relates generally to rear doors for truck caps that are specifically designed to accommodate tailgates equipped with a protective rib that extends along an upper end of the tailgate. Still more specifically, the present invention relates to a rear door of a truck cap with an improved design at the lower end thereof to accommodate a protective rib that extends along an upper end of a tailgate.

BACKGROUND OF THE INVENTION

In the past, tailgates for pickup trucks included a relatively flat outer wall. Accordingly, rear doors of truck caps and camper shells were designed with lower ends that folded downward so that the lower end of the rear door simply overlapped the upper end of the tailgate. This overlapping arrangement protected against the intrusion of moisture and dirt between the rear door of the truck cap and the upper end of the tailgate. Further, a suitable seal was provided by a rubber strip or other suitable soft material being disposed at the interior of the lower end of the rear door of the truck cap, or the lower portion of the rear door that engages the upper end of the tailgate.

However, the design of tailgates is currently undergoing a substantial change. Specifically, truck manufacturers have begun to incorporate a protective rib disposed along the upper end of the outer wall of the tailgate. The purpose of the protective rib is to prevent scratches and dents from occurring on the main portion of the outer wall of the tailgate in the event the tailgate engages an object as it is pivoted downward to the open position. The protective rib also protects against damage occurring at the upper end of the tailgate, which is a common location of rust and corrosion.

The incorporation of a protective rib along the upper end of the tailgate has presented problems for the manufacturers of truck caps and camper shells. Specifically, currently-available rear doors for truck caps and camper shells are not designed to provide a seal for a tailgate equipped with a protective rib disposed at the upper end of the tailgate. However, it is important that the lower end of the rear door of the truck cap provide at least a minimal seal between the door and the tailgate so as to prevent the unwanted intrusion of water and dirt inside of the truck cap or camper shell. Further, if the rear door of the cap shell is provided with a downwardly extending rubber gasket, the interference between the rubber gasket and the protective rib will often prohibit the rear door from closing fully, thereby preventing the rear door from being locked as well as preventing the rear door from providing a sealing closure for the interior of the truck cap or camper shell.

Accordingly, there is a need for an improved truck cap with a rear door designed specifically for newer tailgates equipped with protective ribs disposed at the upper ends thereof. Still further, there is a need for a retrofit kit or modifying kit for existing truck caps which would enable the existing truck caps to be retrofitted so that they can accommodate trucks having newer tailgate designs or tailgate designs that incorporate a protective rib.

SUMMARY OF THE INVENTION

The present invention satisfies the aforenoted needs by providing a rear door assembly for a truck cap that is mounted onto a truck bed equipped with a tailgate having an outwardly protruding tailgate protector rib that extends along an upper end of the tailgate. The rear door assembly comprises a rear door having a lower end for engaging the upper end of the tailgate. The lower end of the rear door comprises a tailgate enclosure plate which curves or extends outwardly and downwardly around at least a portion of the tailgate protector rib.

In an embodiment, the tailgate enclosure plate comprises an underside that faces the tailgate protector rib. The underside of the tailgate protector plate is coated or otherwise attached to a layer of soft polymeric material, such as rubber or artificial rubber, for engaging the tailgate protector rib.

In an embodiment, the tailgate protector rib includes a first opposing end and a second opposing end. Similarly, the tailgate enclosure plate includes a first opposing and a second opposing end. The first opposing end of the tailgate enclosure plate curves outwardly and downwardly around at least a portion of the first opposing end of the tailgate protector rib and, similarly, the second opposing end of the tailgate enclosure plate curves outwardly and downwardly around at least a portion of the second opposing end of the tailgate protector rib.

In an embodiment, the tailgate enclosure plate is integrally connected to the lower end of the rear door.

In an embodiment, the tailgate enclosure plate is welded to the lower end of the rear door.

In an embodiment, the tailgate enclosure plate is fastened to the lower end of the rear door.

In an embodiment, the rear door comprises a bottom edge and the tailgate enclosure plate is connected to the bottom edge of the rear door.

In an embodiment, the present invention provides an improved vehicle that comprises a truck cap mounted onto a truck bed. The truck cap comprises a rear door with a lower end and the truck bed comprises a tailgate having an upper edge that includes an outwardly protruding tailgate protector rib that extends along the upper edge thereof. The lower end of the rear door engages the upper end of the tailgate. The lower end of the rear door comprises a tailgate enclosure plate which includes a curved outer edge that extends around at least a portion of the tailgate protector rib.

In an embodiment, the present invention provides a kit for retrofitting a bottom edge of a rear door of a truck cap to accommodate tailgates equipped with a protective rib extending along an upper end thereof. The kit comprises a tailgate enclosure plate comprising an outer edge that curves outwardly and downwardly, and, a plurality of fasteners for attaching the tailgate enclosure plate to a bottom edge of the rear door of the truck cap.

Other objects and advantages of the present invention will become apparent upon reading the following detailed description and appended claims, and upon reference to the accompanying drawings.

BRIEF DESCRIPTION OF THE DRAWINGS

For a more complete understanding of the present invention, reference should now be made to the embodiments illustrated in greater detail in the accompanying drawings and described below by way of examples of the invention.

In the drawings:

FIG. 1 is a perspective view of a tailgate enclosure plate made in accordance with the present invention and a tailgate protector rib;

FIG. 2 is a partial sectional view of a rear door of a truck cap made in accordance with the present invention and equipped with a tailgate protector plate in a closed position so that the tailgate enclosure plate partially covers a tailgate protector rib disposed at an upper end of a tailgate;

FIG. 3 is a partial side view of a vehicle equipped with a truck cap made in accordance with the present invention as well as with a tailgate equipped with a tailgate protector rib; and FIG. 4 is a partial side view of a vehicle equipped with a truck cap made in accordance with the present invention as well as with a tailgate equipped with a tailgate protector rib.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Turning to FIG. 1, a tailgate enclosure plate 11 made in accordance with the present invention is shown in a spaced relationship above a tailgate protector rib 12. The tailgate enclosure plate 11 is intended to be attached to an underside 13 of a lower end 14 of a rear door 15 of a truck cap as shown in FIG. 2. The enclosure plate 11 extends outwardly beyond the rear door 15 and downwardly around the rib 12 as shown in FIG. 2. Further, again referring to FIG. 1, the opposing ends 16, 17 of the enclosure plate 11 may also curve outwardly and downwardly so as to enclose outer ends 18, 19 of the protector rib 12. As shown in phantom with respect to the end 18 of the tailgate protector rib 12 in FIG. 1, the ends 18, 19 of the tailgate protector rib 12 may also include a curved surface. Accordingly, the curved surface disposed at the outer end 16, 17 of the tailgate enclosure plate 11 are suitable for enclosing such a configuration.

The tailgate enclosure plate 11 may be fabricated from a rigid material, such as aluminum. However, if a rigid material such as aluminum is employed, an underside 21 of the enclosure plate 11 is preferably coated with a soft or resilient material, such as rubber or artificial rubber. Further, the inclusion of a softer material at the underside 21 of the enclosure plate 11 further enhances the ability of the enclosure plate 11 to provide a seal against the protector rib 12.

Turning to FIGS. 3 and 4, cap shells 16a and 16b are illustrated. The cap shell 16a includes a slide-over rear door 15a having a lower end 14a that is equipped with a tailgate enclosure plate 11 as shown in FIGS. 1 and 2. In contrast, the cap shell 16b shown in FIG. 4 may include a standard rear door 15b with a lower end 14b equipped with the enclosure plate 11 as shown in FIGS. 1 and 2 which is seen covering at least a portion of the tailgate protector rib shown at 12.

The present invention may also provide the tailgate enclosure plate 11 in the form of a retro fit kit to be mounted to lower or bottom edges of existing rear doors of cap shells. If the enclosure plate 11 is provided in the form of a retro fit kit, a means for fastening the plate 11 to the rear door of a cap shell should be provided. One means for attaching the enclosure plate 11 to a rear door would be providing a plurality of rivets or bolts with the enclosure plate as shown at 22 in FIG. 1. It will be noted that the enclosure plate 11 may be attached to the rear door 15 by way of bolts, rivets or welding. Also, the enclosure plate 11 may be integrally formed with the rear door 15.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A rear door assembly for a truck cap mounted onto a truck bed with a tailgate equipped with an outwardly protruding tailgate protector rib that extends along an upper end thereof, the rear door assembly comprising:

a rear door comprising a lower end for engaging the upper end of the tailgate, the lower end of the rear door being fixedly connected to a tailgate enclosure plate, the tailgate enclosure plate extending outwardly and downwardly around the tailgate protector rib, the tailgate enclosure plate comprising an underside which is coated with a layer of polymeric material for engaging the tailgate protector rib, the tailgate protector rib including first and second opposing ends and the tailgate enclosure plate including first and second outer ends, the first outer end of the tailgate enclosure plate curving outwardly and downwardly around at least a portion of the first opposing end of the tailgate protector rib, the second outer end of the tailgate enclosure plate curving outwardly and downwardly around at least a portion of the second opposing end of the tailgate protector rib.

2. A vehicle comprising:

a truck cap mounted onto a truck bed, the truck cap comprising a rear door with a lower end, the truck bed comprising a tailgate comprising an upper edge comprising an outwardly protruding tailgate protector rib, the lower end of the rear door engages the upper end of the tailgate, the lower end of the rear door being fixedly connected to a tailgate enclosure plate, the tailgate enclosure plate comprising a curved outer edge that extends around the tailgate protector rib, the tailgate enclosure plate comprising an underside which is coated with a layer of polymeric material for engaging the tailgate protector rib, the tailgate protector rib including first and second opposing ends and the tailgate enclosure plate including first and second outer ends, the first outer end of the tailgate enclosure plate curving outwardly and downwardly around at least a portion of the first opposing end of the tailgate protector rib, the second outer end of the tailgate enclosure plate curving outwardly and downwardly around at least a portion of the second opposing end of the tailgate protector rib.

3. A kit for retrofitting a bottom edge of a rear door of a truck cap to accommodate tailgates equipped with a protective rib extending along an upper end thereof, the kit comprising:

a tailgate enclosure plate comprising an outer edge that curves outwardly and downwardly, the tailgate enclosure plate including first and second outer ends, the first outer end of the tailgate enclosure plate curving outwardly and downwardly and the second outer end of the tailgate enclosure plate curving outwardly and downwardly, the tailgate enclosure plate further comprising an underside which is coated with a layer of polymeric material for engaging the tailgate protector rib, a plurality of fasteners for attaching the tailgate enclosure plate to the bottom edge of the rear door.

* * * * *